US005473597A

United States Patent [19]
Yajima

[11] Patent Number: 5,473,597
[45] Date of Patent: Dec. 5, 1995

[54] TEST CIRCUIT OF MULTIPLEX EQUIPMENT

[75] Inventor: Noboru Yajima, Kawasaki, Japan

[73] Assignee: Fujitsu Limited, Kanagawa, Japan

[21] Appl. No.: 201,777

[22] Filed: Feb. 25, 1994

[30] Foreign Application Priority Data

Sep. 8, 1993 [JP] Japan .................. 5-223223

[51] Int. Cl.$^6$ .................................. H04J 3/14
[52] U.S. Cl. .............. 370/15; 370/112; 371/20.4; 371/20.5
[58] Field of Search .................. 370/13, 15, 41, 370/112; 371/20.1, 20.4, 20.5; 379/5

[56] References Cited

U.S. PATENT DOCUMENTS

| | | | |
|---|---|---|---|
| 4,090,035 | 5/1978 | Popkin | 370/15 |
| 4,380,810 | 4/1983 | Canniff | 370/15 |
| 4,601,028 | 7/1986 | Huffman et al. | 370/15 |
| 5,187,704 | 2/1993 | Shimada et al. | 370/13 |

OTHER PUBLICATIONS

Charles Chaille et al., "Fehlererkennung und Fehlerlokalisierung in Datannetzen", Telecom Report Beiheft, Digital–Ubertragungstechnik, vol. 2, 1979, pp. 159–163 (English language abstract—original submitted Feb. 3, 1995).
John R. Curran, "Using testing to pick the right Multiplexer", Data Communications International, Jul. 1989, pp. 95–99.
Charles Chaille, et al., "Fehlererkennung und Fehlerlokalisierung in Datannetzen", Telecom Report Beiheft, Digital–Ubertragungstechnik, vol. 2, 1979, pp. 159–163.

Primary Examiner—Benedict V. Safourek

[57] ABSTRACT

In a multiplex and transmission system, multiplex equipment in one station having a plurality of low speed units and a high speed unit, is connected through two transmission lines to other multiplex equipment in another station having a plurality of low speed units and a high speed unit. The system further includes a test circuit of multiplex equipment comprising a switch group for connecting the low speed units in tandem, on an input line and an output line of the low speed unit in each channel in the one station. When a test is carried out, the low speed output of each low speed unit is connected to the low speed input of the next low speed unit. A low speed signal loop back is executed in the low speed units in the other station. A pulse pattern generator is connected to the low speed input of the low speed unit in the first channel in the one station and a certain pulse pattern is supplied to the low speed input. The low speed output of the last low speed unit in the one station is input to an error detector, and bit error is detected in the low speed unit of all the channels in both stations.

8 Claims, 4 Drawing Sheets

TEST CIRCUIT OF MULTIPLEX EQUIPMENT

BACKGROUND OF THE INVENTION

1. Field of the Invention

The present invention relates to a test circuit for a test of a traffic signal in a multiplex equipment. By using this test circuit, the number of test cables is reduced and a working time for the cable connection can be shortened.

Multiplex equipment which multiplexes low speed signal groups, forms high speed signal groups, and transmits a multiplex signal, is used in a general asynchronous multiplex transmission system or in a synchronous multiplex transmission system wherein all the transmission system operates synchronously.

When multiplex equipment is installed or a failure occurs in the equipment, any failure of a low speed unit must be detected by the error test for the traffic signal. A reduction in the cost of a test cable and in the amount of testing time are required.

2. Description of the Related Art

In an error test for the traffic signal, in conventional multiplex equipment, many connecting cables are necessary, because the low speed units of one station must be connected in tandem. If the number of the low speed unit in N, then N−1 connection cables are necessary. For example, in the case when the low speed signal group is comprised of 63 channels and 2 Mb/s is multiplexed to form a high speed signal group of 140 Mb/s, 62 connection cables are necessary so the cable cost for test equipment increases.

Usually, the cables for the low speed units are connected manually, and accordingly, when many low speed units are connected, a large amount of time is required to connect and disconnect the many test cables. Particularly, when the failing units are detected, the labor time for testing increases, and the cost for the test also rises.

SUMMARY OF THE INVENTION

An object of the present invention is to provide a test circuit for multiplex equipment to be used when the multiplex equipment is installed or a failure occurs in the equipment, wherein the number of the connecting cables and the time taken for the test are reduced.

In a first aspect of the present invention, there is provided a test circuit of multiplex equipment in a multiplex and transmission system, wherein signals supplied to a plurality of first low speed units, each of which is provided in one channel, are multiplexed using a first high speed unit, in multiplex equipment provided in one station. The multiplexed signal is transmitted to a second high speed unit in multiplex equipment in another station. A signal from the second high speed unit is demultiplexed to derive signals that are supplied to a plurality of second low speed units in the multiplex equipment in the other station. The signals supplied to the plurality of second low speed units are multiplexed using the second high speed unit, the multiplexed signal is transmitted back to the first high speed unit, and the signal from the first high speed unit is demultiplexed to derive signals that are supplied to the plurality of first low speed units. The test circuit comprises a switch group, on an input line and an output line of the first low speed unit in each channel, the switch group being provided to connect the first low speed units in tandem. When a equipment is tested, by using the switch group for connecting the low speed units in tandem, the low speed units are connected in tandem so that a low speed output of the first low speed unit in each channel in the one station is connected to a low speed input of the first low speed unit in the next channel. A low speed signal loop back is circulated so that a high speed output of each first low speed unit is connected to a high speed input of the first low speed unit. A pulse pattern generator is connected to a low speed input of the first low speed unit of the first channel, to input a certain pulse pattern. A low speed output of the first low speed unit in the last channel is input to an error detector, so that a low speed signal bit error in the first low speed units in all the channels can be detected.

In a second aspect of the present invention, there is provided a test circuit of a multiplex equipment in a multiplex and transmission system, wherein signals supplied to a plurality of first low speed units, each of which is provided in a channel, are multiplexed using a first high speed unit, in multiplex equipment in one station. The multiplexed signal is transmitted to a second high speed unit in multiplex equipment in another station. A signal from the second high speed unit is demultiplexed to derive signals to be supplied to a plurality of second low speed units in the multiplex equipment in the other station. The signals supplied to the plurality of second low speed units are multiplexed using the second high speed unit, the multiplexed signal is transmitted to the first high speed unit, and a signal from the first high speed unit is demultiplexed to derive signals to be supplied to the plurality of first low speed units. The test circuit comprises a switch group, to an input line and an output line of the first low speed unit in each channel, the switch group is provided to connect the first low speed units in tandem. When an equipment is tested, by using the switch group for connecting the low speed units in tandem; the low speed units are connected in tandem so that a low speed output of the first low speed unit in each channel in the one station is connected to a low speed input of the first low speed unit in the next channel. A high speed signal loop back is circulated so that a high speed output of the first high speed unit is connected to a high speed input of the first high speed unit. A pulse pattern generator is connected to a low speed input of the first low speed unit of the first channel, to input a certain pulse pattern. A low speed output of the first low speed unit in the last channel is input to an error detector, so that a low speed signal bit error in the first low speed units in all the channels can be detected.

In a third aspect of the present invention, there is provided a test circuit of a multiplex equipment in a multiplex and transmission system, wherein signals supplied to a plurality of first low speed units, each of which is provided in one channel, are multiplexed using a first high speed unit, in multiplex equipment provided in one station. The multiplexed signal is transmitted to a second high speed unit in multiplex equipment in another station. A signal from the second high speed unit is demultiplexed to derive signals that are applied to a plurality of second low speed units in the multiplex equipment in the other station. The signals supplied to the plurality of second low speed units are multiplexed using the second high speed unit, the multiplexed signal is transmitted back to the first high speed unit, and the signal from the first high speed unit is demultiplexed to derive signals that are supplied to the plurality of first low speed units. The test circuit comprises a switch group, to an input line and an output line of the first low speed unit in each channel, the switch group being provided to connect the first low speed units in tandem. When an equipment is tested, by using the switch group for connecting the low speed units in tandem, the low speed units are connected in tandem so that a low speed output of the first low speed unit in each channel in the one station is connected to a low speed input of the first low speed unit in the next channel. A low speed signal loop back is circulated so that a low speed output of the second low speed unit in each channel is connected to a low speed input of the second low speed unit. A pulse pattern generator is connected to a low speed input of the first low speed unit of the first channel, to input a certain pulse pattern. A low speed output of the first low speed unit in the last channel is input to an error detector, so that a low speed signal bit error in the first and the second low speed units in all the channel can be detected.

In the above third aspect of the invention, it is preferable that the low speed signal loop back in the other station is circulated by the remote control from the one station.

In a fourth aspect of the present invention, there is provided a test circuit of a multiplex equipment in a multiplex and transmission system, wherein signals supplied to a plurality of first low speed units, each of which is provided in one channel, are multiplexed using a first high speed unit, in multiplex equipment provided in one station. The multiplexed signal is transmitted to a second high speed unit in multiplex equipment in another station. A signal from the second high speed unit is demultiplexed to derive signals that are supplied to a plurality of second low speed units in the multiplex equipment in the other station. The signals supplied to the plurality of second low speed units are multiplexed using the second high speed unit, the multiplexed signal is transmitted back to the first high speed unit, and the signal from the first high speed unit is demultiplexed to derive signals that are supplied to the plurality of first low speed units. The test circuit comprises a switch group, to an input line and an output line of the first low speed unit in each channel, the switch group being provided to connect the first low speed unit in tandem. A switch group for detecting failure point which takes out an output of each channel, in the switch group for connecting the low speed units in tandem when the test is carried out; and a selector for selecting output of each switch in the switch group for detecting failure point. When a equipment is tested, by using the switch group for connecting the low speed units in tandem, the low speed units are connected in tandem so that a low speed output of the first low speed unit in arbitrary group in the one station is connected to a low speed input of the first low speed unit in the next channel. A low speed signal loop back is circulated so that a high speed output of each of first low speed units which are connected in tandem in the one station is connected to a high speed input. A pulse pattern generator is connected to a low speed input of the tandem connected first low speed units in a first channel and the pulse pattern generator inputs a certain pulse pattern, a low speed output of the tandem connected first low speed units in the last channel is taken out through the switch group for detecting failure point and the low speed output is input to an error detector using a selector, and the low speed output of the first low speed unit in each channel is obtained from the arbitrary point and bit error is detected.

In a fifth aspect of the present invention, there is provided a test circuit of a multiplex equipment in a multiplex and transmission system, wherein signals supplied to a plurality of first low speed units, each of which is provided in one channel, are multiplexed using a first high speed unit, in a multiplex equipment provided in one station. The multiplexed signal is transmitted to a second high speed unit in multiplex equipment in another station. A signal from the second high speed unit is demultiplexed to derive signals that are supplied to a plurality of second low speed units in the multiplex equipment in the other station. The signals supplied to the plurality of second low speed units are multiplexed using the second high speed unit, the multiplexed signal is transmitted back to the first high speed unit, and the signal from the first high speed unit is demultiplexed to derive signals that are supplied to the plurality of first low speed units. The test circuit comprises a switch group, to an input line and an output line of the first low speed unit in each channel, the switch group being provided to connect the first low speed units in tandem. A switch group for detecting failure point which takes out an output of each channel, in the switch group for connecting the low speed units in tandem when the test is carried out; and a selector for selecting output of each switch in the switch group for detecting failure point. When the equipment is tested, by using the switch group for connecting the low speed units in tandem, the low speed units are connected in tandem so that a low speed output of the first low speed unit in arbitrary group in the one station is connected to a low speed input of the first low speed unit in the next channel. A high speed signal loop back is circulated so that a high speed output of the first high speed unit is connected to a high speed input of the first high speed unit, a pulse pattern generator is connected to a low speed inputs of the tandem connected first low speed unit in a first channel and the pulse pattern generator inputs a certain pulse pattern, a low speed output of the tandem connected first low speed units in the last channel is taken out through the switch group for detecting failure point and the low speed output is input to an error detector using a selector, and the low speed output of the first low speed unit in each channel is obtained from the arbitrary point and bit error is detected.

In a sixth aspect of the present invention, there is provided a test circuit of a multiplex equipment in a multiplex and transmission system, wherein signals supplied to a plurality of first low speed units, each of which is provided in one channel, are multiplexed using a first high speed unit, in multiplex equipment provided in one station. The multiplexed signal is transmitted to a second high speed unit in multiplex equipment in another station. A signal from the second high speed unit is demultiplexed to derive signals that are supplied to a plurality of second low speed units in the multiplex equipment in the other station. The signals supplied to the plurality of second low speed units are multiplexed using the second high speed unit, the multiplexed signal is transmitted back to the first high speed unit; and the signal from the first high speed unit is demultiplexed to derive signals that are supplied to the plurality of first low speed units. The test circuit comprises a switch group, to an input line and an output line of the first low speed unit in each channel, the switch group being provided to connect the first low speed unit in tandem. A switch group for detecting failure point which selects an output of each channel, in the switch group for connecting the low speed units in tandem when the test is carried out. When the equipment is tested, by using the switch group for connecting the low speed units in tandem, the low speed units are connected in tandem so that a low speed output of the first low speed unit in arbitrary group in the one station is connected to a low speed input of the first low speed unit in the next channel. A low speed signal loop back is circulated so that low speed outputs of the second low speed units corresponding to the first low speed units which are tandem connected, in the other station is connected to a low speed input of the second low speed unit. A pulse pattern generator is connected to a low speed input of the tandem connected first low speed unit in a first channel and the pulse pattern generator inputs a certain pulse pattern, a low speed output of the tandem connected first low speed unit in the last channel is taken out through the switch group for detecting failure point, selected using selector, and input to an error detector, the low speed output of the first and second low speed units in each channel is obtained from an arbitrary point and bit error is detected.

In the sixth aspect of the invention, it is preferable that the low speed signal loop back in the other station is carried out by remote control from the one station.

Other features and advantages of the invention will be apparent from the following description with reference to the accompanying drawings.

DESCRIPTION OF THE PREFERRED EMBODIMENTS

Prior to explanations of embodiments of the present invention, a related art is explained with reference to FIG. 1.

Figure 1:
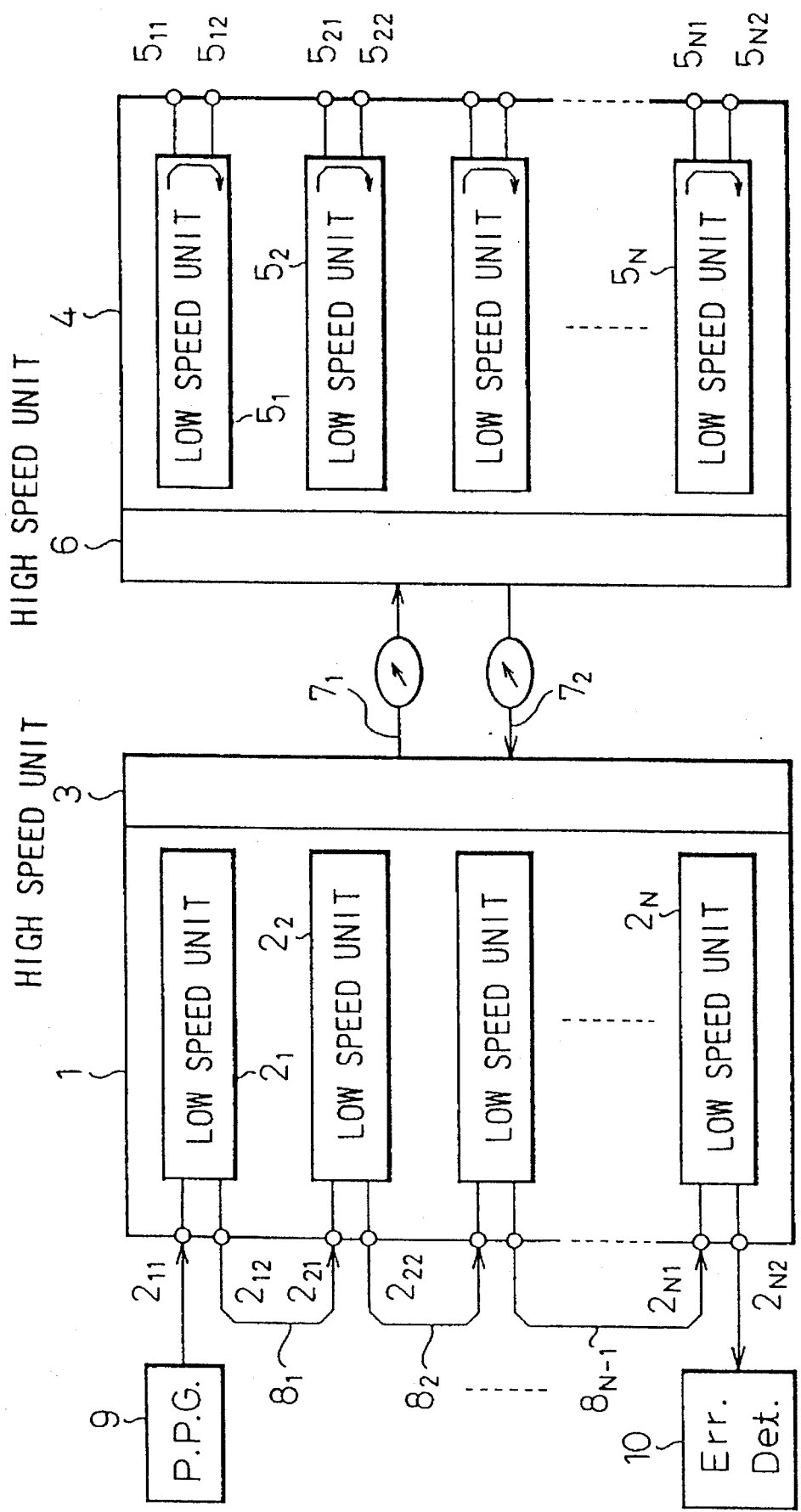
FIG. 1 is a block diagram of a conventional test circuit of a multiplex equipment.

FIG. 1 shows a conventional test circuit of multiplex equipment which is an error test circuit in a traffic signal using remote loop back of a low speed signal.

Figure 4:
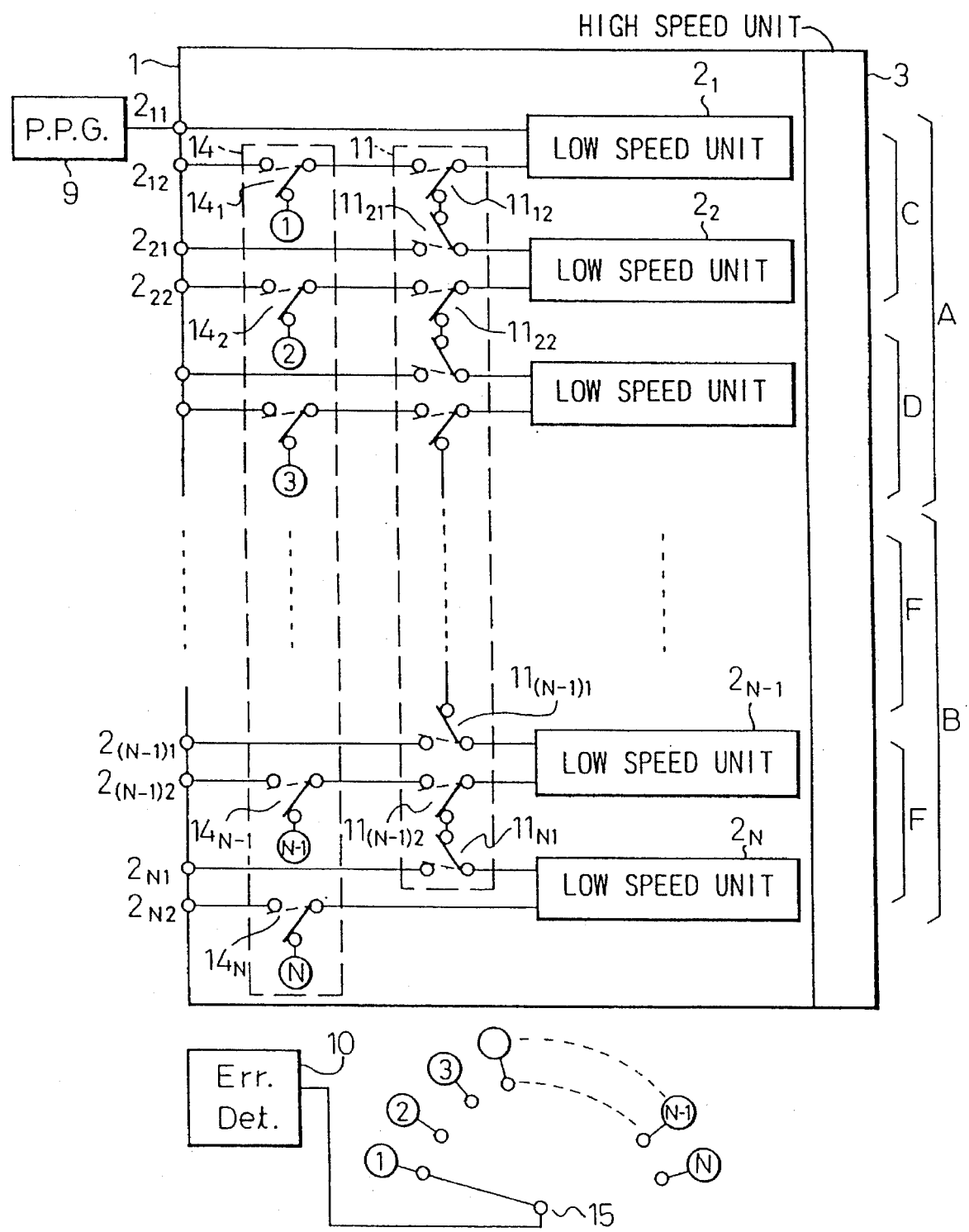
FIG. 4 is a block diagram showing a test circuit of multiplex equipment according to a second embodiment of the present invention.

In FIG. 1, a reference numeral 1 is multiplex equipment (in one station) which includes N first low speed units $2_1, 2_2, \ldots, 2_N$ corresponding to low speed signals of N channels (ch1, ch2, ..., chN), and a first high speed unit 3 which multiplexes or demultiplexes the signals from or to the first low speed units. In the FIG. 4 is other multiplex equipment (in another station) which includes N second low speed units $5_1, 5_2, \ldots, 5_N$ corresponding to low speed signals of N channels (ch1, ch2, ..., chN) and a second high speed unit 6 which multiplexes or demultiplexes the signals from or to the second low speed units. The high speed unit 3 of the multiplex equipment 1 is connected to the high speed unit 6 in the multiplex equipment 4 through the transmission lines (send and receive) $7_1$ and $7_2$ which consist of optical fibers.

The low speed units $2_1, 2_2, \ldots, 2_N$ are connected to input terminals $2_{11}, 2_{21}, \ldots, 2_{N1}$ and output terminals $2_{21}, 2_{22}, \ldots, 2_{N2}$, respectively, and the low speed units $5_1, 5_2, \ldots, 5_N$ are connected to output terminals $5_{11}, 5_{21}, \ldots, 5_{N1}$ and input terminals $5_{12}, 5_{22}, \ldots, 5_{N2}$, respectively. For example, the signal of channel 1 is transmitted between the low speed units $2_1$ and $5_1$ from the input terminal $2_1$ to the output terminal $5_{11}$ and from the input terminal $5_{12}$ to the output terminal $2_{12}$. The same relationship applies to the other low speed units in the other station.

In the above multiplex equipment, when an error test is carried out, connecting cables $8_1, 8_2, \ldots, 8_{N-1}$ are used. Namely, an output terminal of the low speed unit in the multiplex equipment 1 of the one station is connected to an input terminal of the next low speed unit by using a connection cable so that the low speed units are connected in tandem; and in each low speed unit in the multiplex equipment 4 of the other station, an output terminal is connected to an input terminal to form a low speed signal loop back. Further a pulse pattern generator (PPG) 9 is connected to the input terminal $2_{11}$ of the low speed unit $2_1$ in the first channel, and an error detector (Err. Det.) 10 is connected to the output terminal $2_{N2}$ of the low speed unit $2_N$ in the last channel. The low speed signal loop back function is usually provided in multiplex equipment as a failure detecting means, and the function can be controlled remotely from one station. The loop back can be provided in the one station or in the other station, and in the low speed unit or the high speed unit.

In this state, when a pulse signal for testing (forming a certain pattern), instead of a traffic signal, is input from the pulse pattern generator 9, if a bit error is not detected by the error detector 10, all the low speed units in the multiplex equipment 1 and 4 are normal. However, if an error is detected, it is determined that one of the low speed units has failed.

When occurrence of a failure is detected, it is not clear which of the low speed units has failed. In this case, to determine the failed unit, the connecting point of the error detector 10 is changed to the output terminal of the low speed unit at the middle (one half) of all the output terminals in the one station, and the same test is performed. If the error is detected again, it can be determined whether the failed portion exists before or after the mid point.

For example, if the failed portion exists before the mid point, the output terminal of the low speed unit is changed to the mid point of that portion, and the same test is repeated to narrow down the failed portion is. By changing the position of the output terminal of the low speed unit by changing the connecting point for the cables, the failed unit can be determined.

Next, a summary of the present invention is given.

Figure 2:
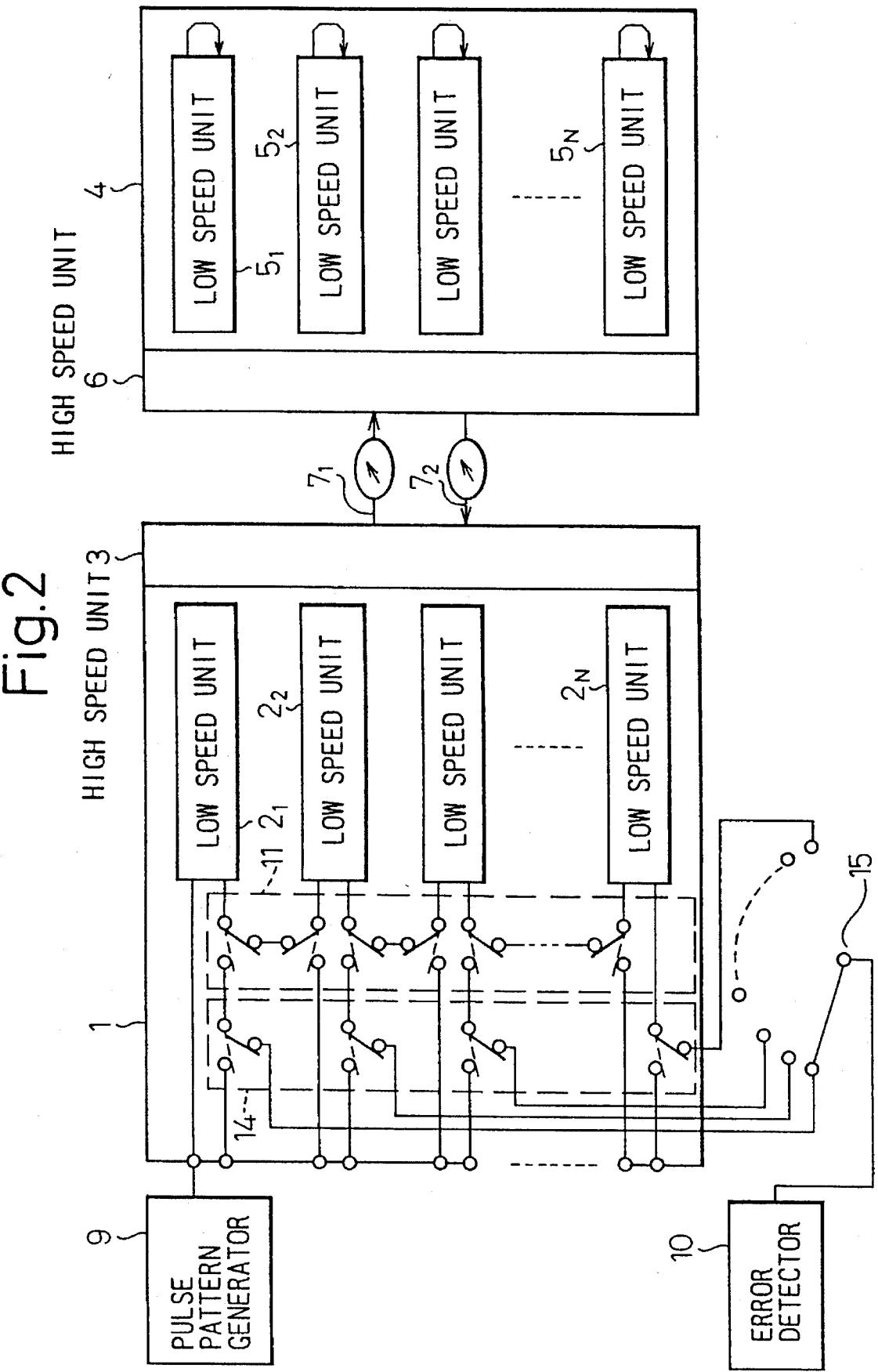
FIG. 2 is a block diagram showing a test circuit of multiplex equipment.

(1) FIG. 2 is a schematic block diagram of the invention. In a multiplex and transmission system to which this invention is applied, a high speed signal in multiplex equipment 1 of one station is connected to a high speed signal in a multiplex equipment 4 of another station through transmission lines $7_1$ and $7_2$. The multiplex equipment 1 multiplexes a plurality of first low speed units $2_1, 2_2, \ldots, 2_N$ in a plurality of channels at a first high speed unit 3 to the high speed signal and transmits the multiplexed signal through the transmission line $7_1$. The signal transmitted through the transmission line $7_1$ is demultiplexed by a second high speed unit 6, and signals of second low speed units $5_1, 5_2, \ldots, 5_N$ are output. Signals supplied to the second low speed units $5_1, 5_2, \ldots, 5_N$ are multiplexed by the second high speed unit, and the multiplex signal is transmitted through the transmission line $7_2$. The transmitted signal is supplied to the first high speed unit 3, and the multiplexed signal is demultiplexed by the first high speed unit 3. The demultiplexed signals are supplied to the first low speed units, and the supplied signals are output from the respective low speed units $2_1, 2_2, \ldots, 2_N$.

In the above system, a switch group 11 for connecting the first low speed units in tandem, on an input line and an output line of the first low speed unit in each channel in one station is provided. Then, when a test is carried out, the low speed output of the first low speed unit is connected to the low speed input of the first low speed unit of the next channel, and thus the tandem connection of the low speed units is carried out.

Next, a pulse pattern generator 9 is connected to the low speed input of the low speed unit $2_1$ in the first channel and a certain pulse pattern instead of a traffic signal is input. Then, by inputting the low speed output of the last low speed unit $2_N$ to the error detector 10, and bit error of the low speed output in the low speed units in all the channel of the one station is detected.

Accordingly, by using the present invention, when the error free test of the traffic signal is carried out in the multiplex equipment, the connections between the low speed units by the connection cables is not necessary, and the number of test cables is reduced. Further reduction of the longer test time for being required by the cable connection can be carried out.

(2) In the above case, when the test is carried out, the low speed signal tandem connection wherein the low speed output of the first low speed unit in each channel in the one station is connected to the low speed input of the first low speed unit of the next channel, is carried out, and by executing the high speed signal loop back wherein the high speed output of the first high speed unit is connected to the high speed input of the first high speed unit, a bit error in the low speed output in any of the first low speed units of all the channels may be detected.

(3) In the above case, when the test is carried out, the low speed signal tandem connection wherein the low speed output of the first low speed unit in each channel in the one station is connected to the low speed input of the first low speed unit of the next channel, is carried out, and by executing the low speed signal loop back wherein the low speed output of each low speed unit in the other station is connected to the low speed input of the low speed unit, a bit error in the low speed output in any of the first and second low speed units of all the channels may be detected.

(4) The low speed signal loop back in the other station in the case of the above item (3) can be carried out by remote control from the one station.

(5) The switch group 11 for connecting the low speed units in tandem, on the input and output lines of the low speed unit in each channel of the one station, a switch group 14 for detecting a failure point and which selects the output of each channel of the switch group 11 when the test is carried out, and a selector 15 for selecting an output of each switch of the switch group 14, are provided. When the test is carried out, the low speed output of the low speed unit of an arbitrary group in the one station is connected in tandem to the low speed input of the low speed unit of the next channel by the switch group 11, and the low speed signal loop back wherein the high speed output of each low speed unit which is connected in tandem in the one station is connected to the high speed input of the low speed unit, is carried out.

Further, the pulse pattern generator 9 is connected to the low speed input of the low speed unit in the first channel, and instead of the traffic signal, a certain pulse pattern is input to the low speed input. Then, the low speed output of the last low speed unit is taken out by the switch group 14, and this output is selected by the selector 15 and is input to the error detector 10. Thus, by taking out an arbitrary low speed output of the low speed units in each channel in the one station, a bit error may be detected.

(6) In this case, when a test is carried out, the low speed output of the low speed unit of an arbitrary group in the one station is connected in tandem to the low speed input of the low speed unit of the next channel by the switch group 11, and the high speed signal loop back wherein the high speed output of the high speed unit in the one station is connected to the high speed input, is carried out, and thus, by taking out an arbitrary low speed output of the low speed units in each channel in the one station, a bit error may be detected.

(7) In this case, when a test is carried out, the low speed output of the low speed unit of an arbitrary group in the one station is connected in tandem to the low speed input of the low speed unit of the next channel by the switch group 11, and the low speed signal loop back in the other station, wherein the low speed output of each low speed unit corresponding to the tandem connected low speed units in the one station is connected to the low speed input of the low speed unit, is circulated, and thus, by taking out the arbitrary low speed output of the low speed units in each channel in the one station and the other station, bit error may be detected.

(8) In the case of item (7), the low speed signal loop back in the other station can be executed by the remote control from the one station.

Next, embodiments according to the present invention are explained.

Figure 3:
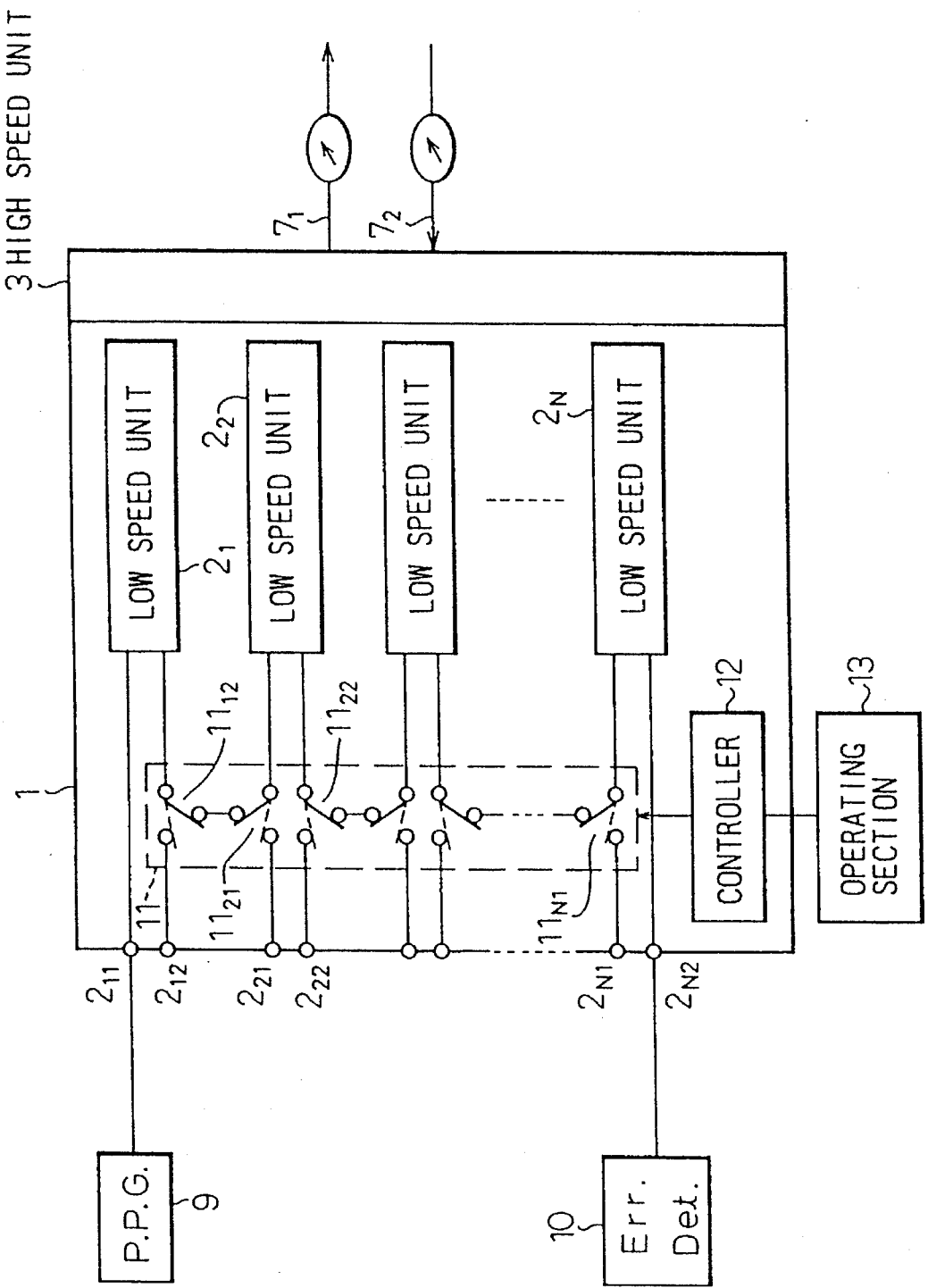
FIG. 3 is a block diagram showing a test circuit of multiplex equipment according to a first embodiment of the present invention.

FIG. 3 shows a first embodiment, the same elements as in FIG. 1 are shown by the same reference numerals, and in FIG. 3, only a multiplex equipment 1 is shown. A switch group 11 for connecting low speed units in tandem is provided in the multiplex equipment 1. The switch group 11 includes switches $11_{12}, 11_{21}, 11_{22}, \ldots, 11_{N1}$ which are provided between output line and input line which corresponds to each output and input terminals other than an input terminal $2_{11}$ of a first low speed unit $2_1$ in the first channel and an input terminal $2_{N2}$ of the low speed unit $2_N$ in the last channel.

The switches $11_{12}, 11_{21}, 11_{22}, \ldots, 11_{N1}$ are usually transferred in broken line state in FIG. 3 and first low speed units $2_1, 2_2, \ldots, 2_N$ are connected to the input and output terminals. However, at test time, the switches 11 are transferred in a solid line state and the output line of each low speed unit is connected sequentially to the input line of the next low speed unit. The switch group 11 can be constituted of electronic switches which are logical circuits (e.g., CMOS analog switch), relay, or the like.

A controller 12 is a microcomputer or the like, the controller 12 transfers the switch group 11 from the usual state to the test state. An operating section 13 includes key for transferring the states of the switch group 11 through the controller 12.

The switches $11_{12}, 11_{21}, 11_{22}, \ldots, 11_{N1}$ are usually transferred to the state of broken line in FIG. 3 by the operating section 13, through the controller 12, and the input and output portions of the low speed units $2_1, 2_2, \ldots, 2_N$ are connected to the input and output terminals $2_{12}, 2_{21}, 2_{22}, \ldots, 2_{N1}$, respectively. Thus, the multiplex equipment 1 becomes in usual operating state.

When test is carried out, the switch $11_{12}, 11_{21}, 11_{22}, \ldots, 11_{N1}$ are transferred to the state of the solid line in FIG. 3 by the operating section 13, through the controller 12. In the low speed unit $2_1, 2_2, \ldots, 2_N$, an output line of a low speed unit is connected to an input line of the next low speed unit, thus, the tandem connection state of the low speed unit can be realized as the same as the test circuit of the conventional multiplex equipment shown in FIG. 1.

Further in this case, either of the low speed signal loop back wherein the high speed output of each low speed unit in the one station is connected to the high speed input, the high speed loop back wherein the high speed output of the high speed unit in the one station is connected to the high speed input, and the low speed signal loop back wherein the low speed output of each low speed unit in the other station is connected to the low speed input, is carried out.

In this state, the pulse pattern generator 9 is connected to the input terminal $2_{11}$ of the first low speed unit in the first channel, and the error detector 10 is connected to the output terminal $2_{N2}$ of the first low speed unit in the last channel, and simultaneously, by executing the low speed signal loop back wherein each output terminal is connected to each input terminal in each low speed unit of the other station, error free test of the traffic signal regarding the low speed units of all the channel in the one station or the low speed units of all the channel in both the stations, can be carried out, as the same as the test circuit of the conventional multiplex equipment shown in FIG. 1.

FIG. 4 shows a second embodiment according to the present invention. The same elements in FIG. 3 show the same reference numerals. In FIG. 3, only the multiplex equipment 1 in the one station is shown. A reference numeral 14 is a switch group for detecting failure point which is provided in the multiplex equipment 1 and includes switches $14_1, 14_2, \ldots, 14_N$. A reference numeral 15 is a selector having N number of the contacts.

The switches $14_1, 14_2, \ldots, 14_N$ connects the output lines of the switches $11_{12}, 11_{22}, \ldots, 11_{(N-1)2}$ to the outputs of the low speed units $2_1, 2_2, \ldots, 2_N$, and usually each of the output lines is connected to the output terminals $2_{12}, 2_{22}, \ldots, 2_{N2}$, respectively. When test is carried out, an arbitrary selected output is connected to the selector 15. Further, by using the selector 15, an arbitrary output of the switch group 14 is selected and one of the outputs of the low speed units $2_1, 2_2, \ldots, 2_N$ is connected to the error detector.

In the embodiment in FIG. 4, by using the switch group 11, the low speed unit of an arbitrary group is made to connect in tandem and by using the switch group 14 for detecting failure point and the selector 15, the output of the last low speed unit which is connected in tandem is selected and an arbitrary group in the low speed units $2_1, 2_2, \ldots, 2_N$ can realize the low speed unit tandem connection.

Further in this case, either of the low speed signal loop back wherein the high speed output of each low speed unit in the one station is connected to the high speed input, the high speed signal loop back wherein the high speed output of the high speed unit in the one station is connected to the high speed input, or the low speed signal loop back wherein the low speed output of each low speed unit in the other station is connected to the low speed input, is carried out.

In this state, the pulse pattern generator 9 is connected to the low speed input of the low speed unit in the first channel, which unit is connected in tandem, and supplies a certain pulse pattern. Then, the low speed output of the low speed unit in the last channel which is connected in tandem is taken out through the switch group 14, and simultaneously, the taken out output is selected by the elector 15 and is input to the error detector 10. Thus, the low speed unit of each channel in the one station or the low speed output of the low speed unit in each channel in both the stations is selected arbitrarily, bit error is detected, and error free test of the traffic signal can be carried out.

In this case, as shown by the conventional example of FIG. 1, the failed unit can be determined by arbitrary selection of the low speed output. Namely, first, by using the switch group 11, the low speed units of one half in all the units of the one station are connected in tandem. Then, by using the switch group 14 and the selector 15, the output of the last low speed unit is selected, and error free test is carried out. Thus, it is determined whether the failure exists in group A or not in FIG. 4. If the failure does not exist in group A, the tandem connected and remained low speed units (½ of all the units) are tested similarly, and it is determined that the failure exists in group B.

For example, if the failure exists in group A, by the switch group 11, one half of the low speed units (group C in FIG. 4) in group A are connected in tandem and by using the switch group 14 and the selector 15, the output of the last low speed unit is selected. Then, error free test is carried out, and it is determined whether the failure exists in group C or not. If the failure does not exist in group C, the remained low speed units (group D in FIG. 4) are connected in tandem and tested similarly, and it is determined whether the failure exists in group D or not.

As mentioned above, by changing of division of the group using the switch group 11 and by changing of selection using the switch group 14 and the selector 15, the group of the low speed units is sequentially shortened and the failed unit can be determined. In this embodiment, the change of the connection of the output of the low speed units is carried out by only operations of switch group 11, switch group 14 and selector 15, accordingly, the failed unit can be determined easily.

As explained above, by using this invention, since the connections between the low speed units through the connection cables are not necessary when the error free test of the traffic signal is carried out; a number of the test cable is reduced, the cost of the cables for an equipment is reduced, the reduction of the testing time required by cable connections when the equipment is installed or tested can be accomplished.

I claim:

1. A test circuit in a multiplex and transmission system, wherein traffic signals supplied to a plurality of first low speed units, each of which is provided in one channel, are multiplexed using a first high speed unit in first multiplex equipment provided in a first station; the multiplexed signal being transmitted to a second high speed unit in second multiplex equipment in a second station; a signal from the second high speed unit being demultiplexed to derive signals that are supplied to a plurality of second low speed units in the multiplex equipment in the second station; the traffic signals supplied to the plurality of second low speed units being multiplexed using the second high speed unit; the multiplexed signal being transmitted back to the first high speed unit; and a signal from the first high speed unit being demultiplexed to derive signals that are supplied to the plurality of first low speed units, said test circuit comprising:

a switch group, on an input line and an output line of the first low speed unit in each channel, for connecting the first low speed units in series during a test of said system;

during said test, the switch group connecting the low speed units in series, with a low speed output of a first low speed unit in each channel in the first station connected to a low speed input of a first low speed unit in the next channel; a low speed signal loop back being circulated with a high speed output of each first low speed unit connected to a high speed input of the first low speed unit;

a pulse pattern generator connected to a low speed input of the first low speed unit of the first channel, to input a certain pulse pattern;

an error detector for receiving as an input a low speed output of the first low speed unit in the last channel, a low speed signal bit error in the first speed units in all the channels being detected.

2. A test circuit in a multiplex and transmission system, wherein traffic signals supplied to a plurality of first low speed units, each of which is provided in one channel, are multiplexed using a first high speed unit in first multiplex equipment provided in a first station; the multiplexed signal being transmitted to a second high speed unit in second multiplex equipment in a second station; a signal from the second high speed unit being demultiplexed to derive signals that are supplied to a plurality of second low speed units in the multiplex equipment in the second station; the traffic signals supplied to the plurality of second low speed units being multiplexed using the second high speed unit; the multiplexed signal being transmitted back to the first high speed unit; and a signal from the first high speed unit being demultiplexed to derive signals that are supplied to the plurality of first low speed units, said test circuit comprising:

a switch group, on an input line and an output line of the first low speed unit in each channel, for connecting the first low speed units in series during a test of said system;

during said test the switch group connecting the low speed units in series, with a low speed output of a first low speed unit in each channel in the first station connected to a low speed input of a first low speed unit in the next channel; a high speed signal loop back being circulated with a high speed output of the first high speed unit connected to a high speed input of the first high speed unit;

a pulse pattern generator connected to a low speed input of the first low speed unit of the first channel, to input a certain pulse pattern;

an error detector for receiving as an input a low speed output of the first low speed unit in the last channel, a low speed signal bit error in the first speed units in all the channels being detected.

3. A test circuit in a multiplex and transmission system, wherein traffic signals supplied to a plurality of first low speed units, each of which is provided in one channel, are multiplexed using a first high speed unit in first multiplex equipment provided in a first station; the multiplexed signal being transmitted to a second high speed unit in second multiplex equipment in a second station; a signal from the second high speed unit being demultiplexed to derive signals that are supplied to a plurality of second low speed units in the multiplex equipment in the second station; the traffic signals supplied to the plurality of second low speed units being multiplexed using the second high speed unit; the multiplexed signal being transmitted back to the first high speed unit; and a signal from the first high speed unit being demultiplexed to derive signals that are supplied to the plurality of first low speed units, said test circuit comprising:

a switch group, on an input line and an output line of the first low speed unit in each channel, for connecting the first low speed units in series during a test of said system;

during said test, the switch group connecting the low speed units in series, with a low speed output of a first low speed unit in each channel in the first station connected to a low speed input of a first low speed unit in the next channel; a low speed signal loop back being circulated with a low speed output of the second low speed unit in each channel connected to a low speed input of the second low speed unit;

a pulse pattern generator connected to a low speed input of the first low speed unit of the first channel, to input a certain pulse pattern;

an error detector for receiving as an input a low speed output of the first speed unit in the last channel, a low speed signal bit error in the first and the second low speed units in all channels being detected.

4. A test circuit as in claim 3, wherein said low speed signal loop back in the second station is executed by remote control from the first station.

5. A test circuit in a multiplex and transmission system, wherein traffic signals supplied to a plurality of first low speed units, each of which is provided in one channel, are multiplexed using a first high speed unit in first multiplex equipment provided in a first station; the multiplexed signal being transmitted to a second high speed unit in second multiplex equipment in a second station; a signal from the second high speed unit being demultiplexed to derive signals that are supplied to a plurality of second low speed units in the multiplex equipment in the second station; the traffic signals supplied to the plurality of second low speed units being multiplexed using the second high speed unit; the multiplexed signal being transmitted back to the first high speed unit; and a signal from the first high speed unit being demultiplexed to derive signals that are supplied to the plurality of first low speed units, said test circuit comprising:

a first switch group of switches, on an input line and an output line of the first low speed unit in each channel, for connecting the first low speed units in series during a test of said system;

a second switch group of switches for detecting a failure point, which takes out an output of each channel, in the first switch group for connecting the low speed units in series when the test is carried out; and a selector for selecting the output of each said switch in the second switch group for detecting failure point;

during said test, the first switch group connecting the low speed units in series with a low speed output of a first low speed unit in an arbitrary group in the first station connected to a low speed input of a first low speed unit in the next channel; a low speed signal loop back being circulated with a high speed output of each of the first low speed units connected in series in the first station connected to a high speed input;

a pulse pattern generator connected to a low speed input of the series connected first low speed unit in a first channel, the pulse pattern generator inputting a certain pulse pattern;

an error detector, a low speed output of the series connected first low speed unit in the last channel being taken out through the second switch group for detecting a failure point, and the low speed output being input to said error detector using the selector; and the low speed output of the first low speed unit in each channel being obtained from the arbitrary point to detect bit error.

6. A test circuit in a multiplex and transmission system, wherein traffic signals supplied to a plurality of first low speed units, each of which is provided in one channel, are multiplexed using a first high speed unit in first multiplex equipment provided in a first station; the multiplexed signal being transmitted to a second high speed unit in second multiplex equipment in a second station; a signal from the second high speed unit being demultiplexed to derive signals that are supplied to a plurality of second low speed units in the multiplex equipment in the second station; the traffic signals supplied to the plurality of second low speed units being multiplexed using the second high speed unit; the multiplexed signal being transmitted back to the first high speed unit; and a signal from the first high speed unit being demultiplexed to derive signals that are supplied to the plurality of first low speed units, said test circuit comprising:

a first switch group of switches, on an input line and an output line of the first low speed unit in each channel, for connecting the first low speed units in series during a test of said system;

a second switch group of switches for detecting a failure point, which takes out an output of each channel, in the first switch group for connecting the low speed units in series when the test is carried out; and a selector for selecting the output of each said switch in the second switch group for detecting a failure point;

during said test, the first switch group connecting the low speed units in series, with a low speed output of a first low speed unit in an arbitrary group in the first station connected to a low speed input of a first low speed unit in the next channel; a high speed signal loop back being circulated with a high speed output of the first high speed unit connected to a high speed unit;

a pulse pattern generator connected to a low speed input of the series connected first low speed unit in a first channel, the pulse pattern generator inputting a certain pulse pattern;

an error detector, a low speed output of the series connected first low speed unit in the last channel being taken out through the second switch group for detecting a failure point, and the low speed output being input to said error detector using the selector; and the low speed output of the first low speed unit in each channel being obtained from the arbitrary point to detect bit error.

7. A test circuit in a multiplex and transmission system, wherein traffic signals supplied to a plurality of first low speed units, each of which is provided in one channel, are multiplexed using a first high speed unit in first multiplex equipment provided in a first station; the multiplexed signal being transmitted to a second high speed unit in second multiplex equipment in a second station; a signal from the second high speed unit being demultiplexed to derive signals that are supplied to a plurality of second low speed units in the multiplex equipment in the second station; the traffic signals supplied to the plurality of second low speed units being multiplexed using the second high speed unit; the multiplexed signal being transmitted back to the first high speed unit; and a signal from the first high speed unit being demultiplexed to derive signals that are supplied to the plurality of first low speed units, said test circuit comprising:

a first switch group of switches, on an input line and an output line of the first low speed unit in each channel, for connecting the first low speed units in series during a test of said system;

a second switch group of switches for detecting failure point which selects an output of each channel, in the first switch group for connecting the low speed units in series when the test is carried out;

during said test the switch group connecting the low speed units in series, with a low speed output of a first low speed unit in an arbitrary group in the first station connected to a low speed input of a first low speed unit in the next channel; a low speed signal loop back being circulated with low speed outputs of the second low speed units corresponding to the first low speed units, which are series connected in the second station, connected to a low speed input of the second low speed unit;

a pulse pattern generator connected to a low speed input of the series connected first low speed unit in a first channel, the pulse pattern generator inputting a certain pulse pattern;

a selector and an error detector, a low speed output of the series connected first low speed unit in the last channel being taken out through the second switch group for detecting failure point, selected using the selector, and input to the error detector; the low speed output of the first and second low speed units in each channel being obtained from an arbitrary point, bit error being detected.

8. A test circuit as in claim 7, wherein said low speed signal loop back in the second station is carried out by remote control from the first station.

* * * * *